June 21, 1932. M. T. SUEPER 1,863,704
DEVICE FOR APPLYING RUBBER RINGS TO HOT FRUIT JARS
Filed Aug. 12, 1931
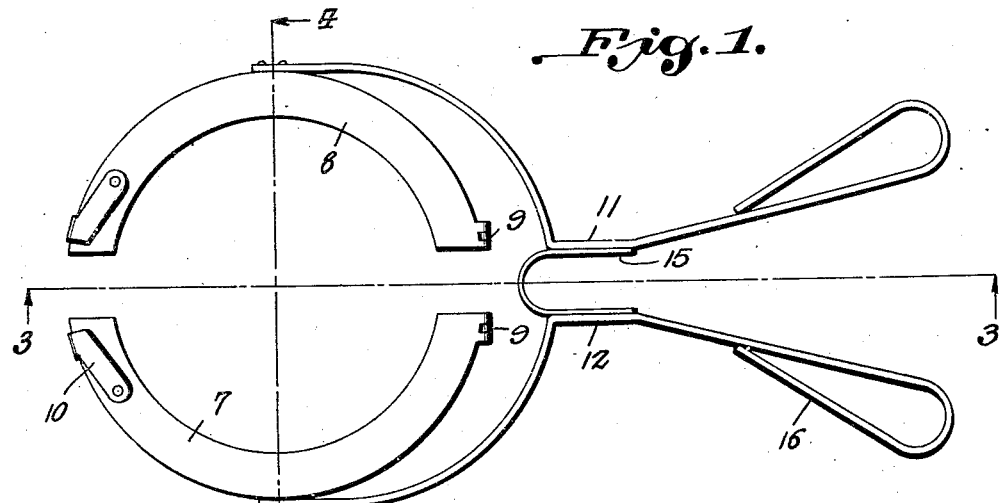
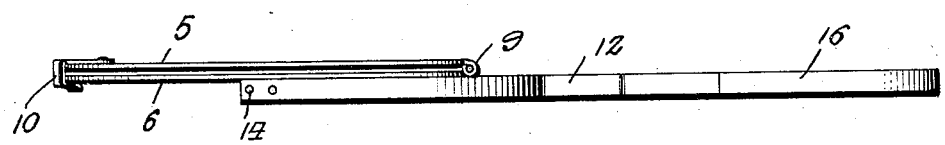
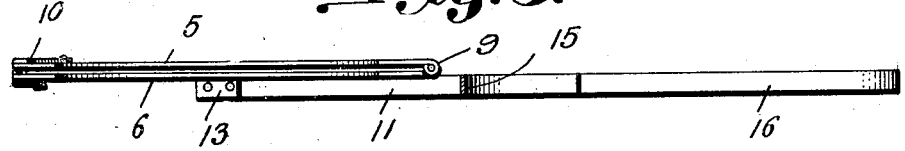
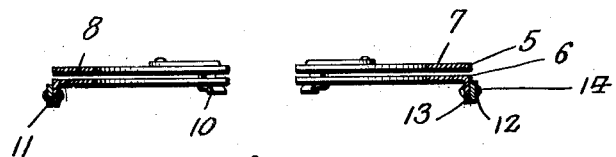

Patented June 21, 1932

1,863,704

UNITED STATES PATENT OFFICE

MARY T. SUEPER, OF LINDSAY, NEBRASKA

DEVICE FOR APPLYING RUBBER RINGS TO HOT FRUIT JARS

Application filed August 12, 1931. Serial No. 556,468.

My invention relates to a device for applying rubber rings to fruit jars and the like.

The primary object of the invention is to provide a device for applying rubber rings to fruit jars while the jars are hot, without the operator having to touch the jar.

A further object of the invention is to provide a device of the above-mentioned character which is simple and durable in construction, reliable and efficient in use and inexpensive to manufacture.

Other objects and advantages of the invention will be apparent during the course of the following description.

In the accompanying drawing, forming a part of this specification and in which like numerals are employed to designate like parts throughout the same, Fig. 1 is a top plan view of the device, Fig. 2 is an edge view of the same, Fig. 3 is a longitudinal section taken on lines 3—3 of Fig. 1, and, Fig. 4 is a transverse section taken on lines 4—4 of Fig. 1.

In the drawing, wherein for the purpose of illustration, I have shown a preferred embodiment of my invention, the numerals 5 and 6 denote upper and lower jaws, between which the rubber ring to be applied to the fruit jar is adapted to be clamped. Both of the jaws are formed of arcuate sections 7 and 8, which are spaced apart, providing a dis-joined ring which fits over the neck of the fruit jar. The corresponding sections of the upper and lower jaws are connected together at one of their ends by the hinges 9, while the opposite ends of the sections are releasably held together by the pivoted clamps 10 attached to the sections of the upper jaw.

The jaws are supported by a pair of parallel handles 11 and 12, which have one end attached to the lugs 13 depending from the sections of the lower jaw 6, by the rivets 14. The intermediate portion of the handles are connected together by the U-shaped spring 15 which normally maintains the sections of the jaws in proper spaced relation, but upon compressing the free ends of the handles which are reversely bent to provide hand grips 16, the spring permits the sections of the jaws to be spread apart.

In use, the clamps 10 are released and the sections of the upper jaw 5, lifted which permits the rubber ring which is to be applied to the jar to be placed between the jaws. The sections of the jaws are then clamped together by the clamps 10, securely holding the rubber ring between the jaws. The handles are then grasped in the hand and slightly compressed to spread the sections of jaws and also the rubber ring, permitting the rubber ring to be easily placed on the neck of the jar. After the rubber ring is applied to the jar, the clamps 10 are released and the jaws moved from engagement with the ring by compressing the handles. Thus, it is seen that I have provided a device which enables rubber rings to be applied to hot fruit jars, without danger of the operator burning his fingers.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A device of the character described comprising upper and lower jaws, each jaw being composed of spaced arcuate sections disposed on a horizontal plane in opposed relation, means pivotally connecting said jaws together so they are capable of moving toward and from each other, and a handle connected to one of said jaws.

2. A device of the character described comprising upper and lower jaws, each jaw being composed of separable arcuate sections, the sections of one jaw being hingedly connected to the sections of the other jaw so as to move toward and from each other.

3. A device of the character described comprising upper and lower jaws, each jaw being composed of separable arcuate sections, the sections of one jaw being hingedly connected to the sections of the other jaw so as to move toward and from each other, and parallel handles having connection with opposite sides of one of said jaws, adapted to spread the sections of said jaws apart.

4. A device of the character described comprising upper and lower transversely divided annular jaws, the divided sections of one of said jaws being hingedly connected to the divided sections of the other jaw, so as to be capable of moving toward and from each other, and handles connected with opposite sides of one of said jaws, adapted to spread the divided sections of said jaws apart.

5. A device of the character described comprising upper and lower jaws, each jaw being composed of separable arcuate sections, the sections of one jaw being hingedly connected to the sections of the other jaw, so as to move toward and from each other, parallel handles having connection with opposite sides of one of said jaws adapted to spread the sections of said jaws apart, and yieldable means connecting said handles together.

6. A device of the character described comprising upper and lower jaws, each jaw being composed of separable arcuate sections, the sections of one jaw being hingedly connected to the sections of the other jaw, so as to move toward and from each other, releasable means for holding said jaws together, parallel handles connected to opposite sides of one of said jaws, and yieldable means connecting said handles together.

In testimony whereof I affix my signature.

MARY T. SUEPER.